April 11, 1967  G. B. COOK  3,313,292
DIAGNOSTIC COMPOSITION PACKAGE
Original Filed May 29, 1961

INVENTOR:
GALEN B. COOK
BY
ATTORNEY

United States Patent Office 3,313,292
Patented Apr. 11, 1967

3,313,292
DIAGNOSTIC COMPOSITION PACKAGE
Galen B. Cook, Columbia, Mo. 65201
Continuation of application Ser. No. 113,413, May 29, 1961, now Patent No. 3,247,841, dated Apr. 26, 1966. This application June 24, 1965, Ser. No. 466,703
2 Claims. (Cl. 128—2)

This application is a continuation of application Ser. No. 113,413, filed May 29, 1961, now Patent 3,247,841. This invention relates to the detection and analysis of abnormalities, particularly small abnormalities in the surfaces defining internal cavities in living animals. It has particular application to the human large intestine, and will be described in connection therewith, but its usefulness is not confined thereto.

The need for a reliable and discerning method for examining the interior of the large intestine can be appreciated by reviewing the diverse and inventive approaches which have evolved in the history of colon diagnosis: radiography of the colon began with the radiopaque enema; this was followed by the double-contrast enema, the use of semi-transparent media, the addition of over-exposed roentgenographic films and high-voltage technique. Subsequently, chemicals such as tannic acid and isatin were added to the barium sulfate, and later external bag compression, filling of the urinary bladder, the Dhassard-Lapine and cephalad-oblique-prone projections were introduced. Proctosigmoidoscopy was begun with the proctosigmoidoscope and extended by lengthening the barrel, by coloscopy through colotomies, by using the traction sigmoidoscope, the suction-lavage sigmoidoscope, the light-guiding transparent plastic Y tube, and, most recently, the flexible coloscope. The third avenue of approach has been cytologic study of material by bulb pipetting, sigmoidoscopic aspiration, enema washing, direct tissue smearing, and millipore filtration of colonic washings.

From this array of techniques useful combinations have emerged and are applied today regularly. The reliability of any combination however is not absolute, nor is the applicability universal for the discovery of small sessile cancers of the large intestine—especially when they are located in the region of the sigmoid colon. A recent evaluation of the accuracy of cytologic study of material collected above the reach of the sigmoidoscope reported only 4.3% reliability. Even with sigmoidoscopes of advanced design the sigmoid colons of 25 percent of patents could not be satisfactorily examined because of anatomical peculiarities. Coloscopy is attended by an appreciable risk of secondary wound infection and is not satisfactory for the examination of the colonic flexures. The accuracy of the barium enema, with all of its modifications, has seldom exceeded 90 percent; in fact, reliabilities as low as 28 percent have been reported.

One of the objects of this invention is to provide a composition package for use in a method for accurately locating and analyzing abnormalities within an internal cavity of a living animal with greater accuracy and less danger, difficulty and expense than methods known heretofore.

Still another object is to provide a composition package for a method for diagnosis of abnormalities in internal cavities of living animals to result in a substantially permanent record.

Other objects will become apparent to those skilled in the art in the light of the following description and accompanying drawing.

In accordance with this invention, generally stated, a composition package is provided for use with a method of diagnosis wherein there is introduced into an internal cavity of a living animal a non-toxic fluent material capable of being set at a temperature compatible with cell viability, preferably body temperature, to a surface-conforming, coherent, unplastic, pliant condition, with a sufficiently fine-grained surface to reproduce for diagnosis the physical features of abnormalities sought to be detected. Preferably, the fluent material contains a radiopaque substance, and the course of the liquid being introduced may be followed radiologically. When the liquid has been introduced to the desired position, it is set in situ. Again, preferably, an intumescant is activated during the setting process, to ensure that the surface of the set material is in snug but physiologically harmless engagement with the surfaces defining the cavity, and to produce a spongy, soft mass.

The set material is then caused to be removed from the cavity. In the case of the colon, preferably the set material is evacuated by defecation.

In the interests of accuracy, it is important, particularly in the diagnosis of abnormalities in the large intestine, that the cavity be purged of excrement. In the case of colon, a simple enema has been found entirely satisfactory. Also in the case of the large intestine, it has been found desirable, though not absolutely essential, to maintain the area below the superior valve of the rectum free of set material, as by a small inflatable bladder, surrounding the tube by which fluent material is introduced.

Preferably, the fluent material consists of a liquid elastomeric substance, vulcanizing or "polymerizing" agent, an intumescant, and a radiopaque material. Not all of these elements need be included. It is necessary, however, that the composition be sufficiently fluent to be readily introducible into the cavity; that it be capable of being converted to a surface-conforming, coherent, unplastic, pliant, soft form at body temperature or near to it; and that it be nontoxic in both its fluent and solid states. Preferably, it is a liquid with low initial viscosity, miscible with radiopaque media. It should be converted from liquid to solid rapidly and predictably within narrow limits, and preferably, endothermically. If the setting, crosslinking or vulcanizing process is exothermic, the temperature rise must be very small. The solid material should be freely and atraumatically separable from mucous membrane, or any other body surface under study.

It has been found that, particularly with the preferred embodiment of composition, described hereafter, excellent control is possible, the material "polymerizes" (actually it is believed to crosslink) to a satisfactory solid state in the body within about ten minutes of its introduction, the resultant spongy mass is readily and painlessly evacuated, the surface of the model produced faithfully reflects the abnormalities of the mucosal surface, and sufficient numbers of the cells from the surfaces of the abnormalities adhere to the model to make the analysis and diagnosis of the abnormalities more certain than methods known heretofore.

In order to perform the method described and to utilize effectively the compositions used in the performance of the method, a package has been provided, comprising a suitable incipiently intumescent composition, a flexible bag in which the incipiently intumescent composition is contained and a rupturable container of activator also within the bag. Preferably the composition package includes a conduit and body cavity blocking means.

Figure 1:
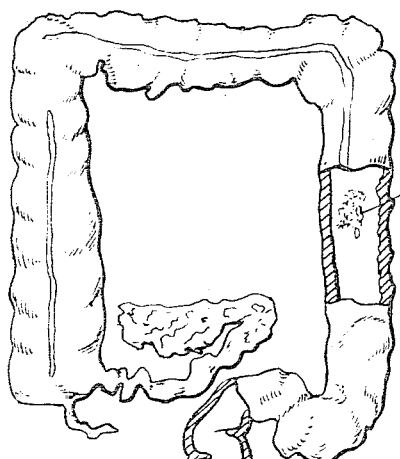
FIGURE 1 is a diagrammatic view of a human large intestine, partly cut away, showing a tube being inserted per anus.

In the development of the method with which the package of this invention is utilized various materials have been used. The first to be tried was a Thiokol rubber, a condensation polymer of ethylene chloride and sodium tetrasulfide. This material was used successfully in dogs, which have straight colons, but it is too stiff for satisfactory use in human large intestines. Gelatin-egg white compositions (10–30 parts by volume of stiffly foamed egg whites, 90–70 parts bovine gelatin) have also been tried. While they produce a sufficiently pliable model, the model is too fragile (not sufficiently coherent) to be satisfactory. The compositions set forth in the following examples are, with any limitations set forth in an example, eminently satisfactory. However, so far as the method is concerned, it can be appreciated that numerous other materials already commercially available, and others which will become commercially available hereafter, are or will be suitable for the practice of the method, once the method is disclosed.

*Example 1*

| | Parts by weight |
|---|---|
| Room temperature vulcanizing silicone rubber (Silastic RTV 502), a liquid prepolymer dimethyl silicone, about 45,000 cs. | 30 |
| Silicone rubber foam (Silastic Q–3–0030), intumescant, about 5,000 cs. | 30 |
| Cyclic dimethyl polysiloxane (silicone fluid), 20 centistokes | 40 |
| Stannous octoate (catalyst) | 2 |
| Diatrizoate sodium (in 20 parts water), radiopaque material | 25 |

The viscosity of the material, immediately after the catalyst is added, and before setting begins appreciably, is less than 6,000 centistokes.

The method, with the composition of Example 1 as an example, is as follows. The composition of Example 1 was made up, the catalyst being added immediately before the material was used. The material was put into a polyethylene container in a commercial seal gun connected to a rubber tube with an internal diameter of 7 millimeters. The gun delivered the mixture at a pressure of about 5 pounds per square inch. The tube was 25 centimeters long. The patient was positioned so as to permit the flow of liquid to be observed radiographically, the tube was inserted in the colon, per anus, and the liquid introduced. The silicone rubber "foam" was caused to intumesce and both the foaming and nonfoaming silicone rubber were caused to set by the catalyst within a few minutes of the liquid's introduction into the colon. The set model was vacuated by the normal defecatory process of the patient. Cellular material was then removed from the model, and the model studied for imprint detail. It has been found that imprints of abnormalities such as carcinomas and adenomatous polyps are reproduced with excellent clarity. The model faithfully resumes the shape in which it was formed, so that the location of the abnormality can be established with the greatest nicety. In numerous tests of the method conducted on surgical specimens of the sigmoid colon containing adenocarcinomas, small malignancies, which had remained occult in conventional observation, were discovered by a study of the model produced by the method of this invention.

Cells may be removed from the model in various ways, as by forceps or by scraping. Dr. Alexander Margulis has suggested that the model be suspended and agitated in Hartman's (lactated Ringer's) solution. This method of cell removal gives excellent results. When the specimen or model is removed from the Hartman's (lactated Ringer's) solution, the cellular suspensions in the solution are centrifuged and examined microscopically. The cytological examination of the cellular debris from the model in every malignant lesion, was positive for carcinomatous cells.

The drawing illustrates steps in the method in its preferred form. In the embodiment, a plastic bag 1 contains a settable liquid and a rupturable container of catalyst 2. The bag 1 is connected to a tube 3, at the free end of which, and surrounding the tube, is a bladder 4. The tube 3 preferably has an internal diameter between 5 and 20 millimeters. The bladder 4 is sealed and is connected, by means of an air tube 5, to a bulb 6, filled with sufficient gas to expand the bladder 4. A clamp 7 closes the air tube 5.

Figure 2:
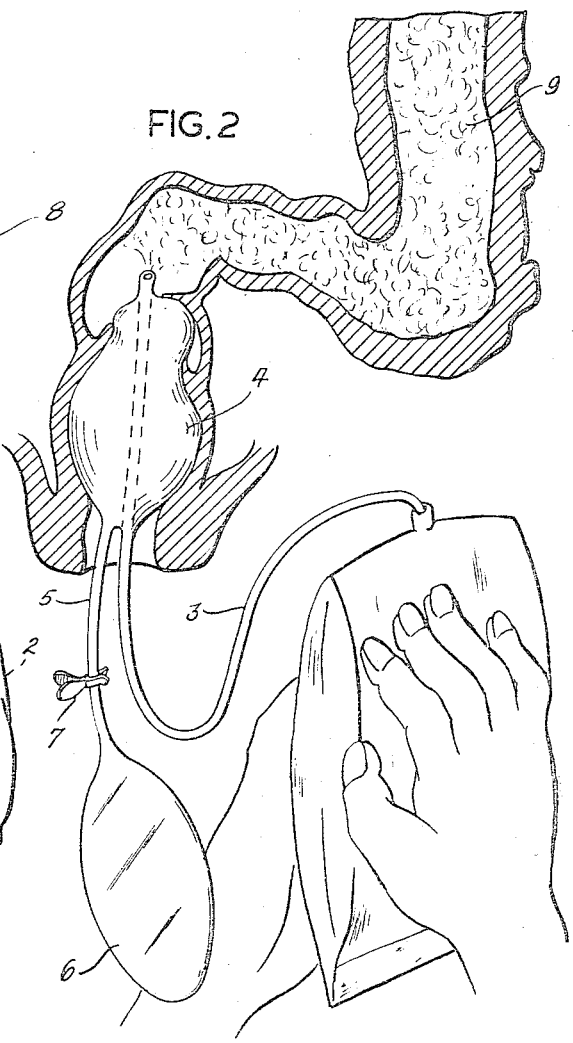
FIGURE 2 is an enlarged detail sectional view showing liquid being introduced to the sigmoid colon of FIGURE 1.
Figure 3:
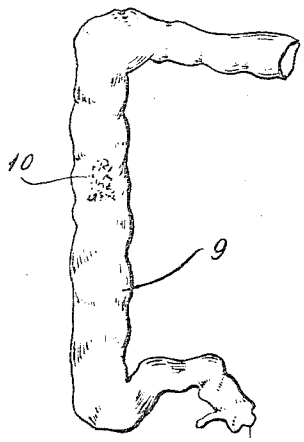
FIGURE 3 is a view in back elevation of a model produced in accordance with the method utilizing the package of the invention, exhibiting the imprint of an abnormality shown in FIGURE 1.

As shown in FIGURE 1, the end of the tube 3 is inserted into the rectum. The clamp 7 is released and the bulb 6 collapsed to inflate the bladder 4. The clamp is then tightened again to maintain the bladder inflated. The container 2 is ruptured and the catalyst quickly mixed with the liquid. The catalyzed liquid is then forced into the colon, as shown in FIGURE 2. The amount of liquid introduced depends upon the length of the large intestine to be surveyed. The liquid then intumesces and sets to form a model 9. When the model 9 is set, the clamp 7 is released to permit the bladder 4 to collapse, and the tube and bladder are withdrawn. The model is then caused to be evacuated. As illustrated in FIGURES 1 and 3, an abnormality 8 in the wall of the colon appears as an imprint 10 in the model. The usefulness of the bladder 4 can be appreciated by an examination of FIGURES 1 and 2.

The method is substantially the same with any of the compositions of the examples, and will be with any compositions exhibiting the desired characteristics. The following examples are merely illustrative of suitable compositions.

*Example 2*

| | Parts by weight |
|---|---|
| Room temperature vulcanizing silicone rubber (Silastic RTV 502), a liquid prepolymer dimethyl silicone, about 45,000 cs. | 50 |
| Silicone rubber foam (Silastic Q–3–0030), intumescant, about 5,000 cs. | 50 |
| Cyclic dimethyl polysiloxane (silicone fluid), 20 centistokes | 2 |
| Diatrizoate sodium (in 20 parts water), radiopaque material | 25 |

The viscosity of the material, immediately after the catalyst is added, and before setting begins appreciably, is less than 6,000 centistokes.

*Example 3*

The following ranges of the silicone ingredients of Examples 1 and 2 have been found operative. Other proportions may be useful, but have not been actually tried.

| | Parts by weight |
|---|---|
| Silastic RTV 502 | 10–40 |
| Silastic Q–3–0030 | 70–30 |
| Silicone fluid | 5–40 |

In any of Examples 1, 2 and 3, other room temperature vulcanizing (RTV) silicone rubbers and silicone fluids may be used. The "Silastic" products are obtainable from Dow Chemical Co. Operative RTV silicone rubber corresponding to Silastic TRV 502 and Q–3–0030 are obtainable from General Electric, designated RTV 11 and RTV 40, and RTV 120 and 160 respectively. These latter are also curable with stannous octoate. Other metal soap catalysts, such as tin dilaurate, iron octoate, and chromium octoate may be used, but they are slower acting, hence not as satisfactory for the purpose in this respect.

Example 4

| | Parts by weight |
|---|---|
| Polysulfide liquid polymer Thiokol LP–2 (Thiokol Chemical Corporation) | 70 |
| Dipolymer oil (plasticizer, thinning agent) | 10 |
| Cumene hydro peroxide (70%) | 8 |
| 3-diethylaminopropylamine | 2 |

The polysulfide liquid polymers (polymers of bis (ethylene oxy) methane containing disulfide linkages) show promise as useful compounds for the method of this invention. They set at room temperature, and admit of the use of numerous curing agents, activators and plasticizers (cf. Bulletin entitled "LP–2 Polysulfide Liquid Polymer," of Thiokol Chemical Corporation, id. 1–61H).

Example 5

A.

| | Mols |
|---|---|
| Adipic acid | 16 |
| Diethylene glycol | 16 |
| Trimethyl propane | 1 |

B. Tolylene diisocyanate.

C.

| | Parts by weight |
|---|---|
| Adipic acid ester of N-diethylaminoethanol | 3 |
| Ammonium oleate | 1 |
| Sulfonated castor oil | 1.5 |
| Water | 1.5 |
| Paraffin oil | 0.5 |

One hundred parts, by volume, of A, forty-seven parts, by volume, of B and ten parts, by volume, of C are mechanically stirred and the mixture quickly introduced. This produces a flexible foamed polyurethane model. For a less dense material, less diisocyanate is used. Such foamed polyurethanes show great promise in vitro. They have not been completely tested in vivo.

Numerous variations, within the scope of the appended claims, in the method and composition of this invention will occur to those skilled in the art in the light of the foregoing disclosure.

For example, any other suitable radiopaque material, compatible with the elastomeric model forming liquid, may be used, such as sodium acetrizoate, sodium diprotriazoate, diatrizoate methyl glucamine, ethyl iodophenylundecylate and barium sulfate. Other catalysts, such as have been suggested above, may be used in conjunction with the silicone rubber liquids, and, of course, other catalysts or vulcanizers may be used with other elastomeric materials.

Other likely elastomeric or model-forming liquids, such as amylose starches, may, as has been suggested, be used.

While the preferred viscosity has been given merely as below 10,000, the viscosity may be, and preferably is, much lower.

In the method, when only a limited length of colon is to be examined, for example, so that there is no danger of introducing an excessive amount of material, or when the capacity of the internal cavity is known, it is not necessary to use the radiologic control, so that no radiopaque material need be incorporated into the mold-forming liquid.

In the case of an internal cavity from which a mold can easily be removed, it may not be necessary to use an intumescent material. However, the intumescent not only provides a spongy core, but, in swelling, provides a snug, though physiologically harmless engagement with the cavity-defining surface, giving a sharply defined impress to the mold.

The use of the viscosity-reducing ingredient is a matter of ease of insertion of the liquid, the pliability of the set material being substantially unaffected thereby.

The terms "fluent," "coherent," "unplastic," "pliant," "intumesce" or "intumescant," and "nontoxic" have been used in the specification and claims in the following senses: "fluent" is used to mean flowable sufficiently to be introduced rapidly and atraumatically into the cavity to be tested; "coherent" is used to mean that the molded shape hangs together sufficiently to be removed intact, or, in extreme constrictive cases, in large sections; "unplastic" is used to mean that the set material is not subject to permanent deformation under the forces applied in the removal of the shape; "pliant" is used to means sufficiently soft to permit atraumatic removal of the molded shape, as by the normal defecatory process from the colon; and "intumesce" is used to mean to swell; preferably by bubbling, to form a soft but snug-fitting shape. "Intumescant" is used to mean the swelling agent and "intumescent," the characteristic of swelling. "Nontoxic" is used to mean that the material (both fluent and set) is substantially harmless as employed in the method of this invention for the duration of time required. Thus, for example, certain of the ingredients per se may be toxic, but used in the particular cavity (e.g. colon), in the concentrations and for the limited time required, have no substantial toxic effect.

Having thus described the invention, what is claimed and desired to be secured by Letters Patent is:

1. A composition package adapted for use in performing a method of diagnosis of abnormalities in the cavity defining wall of a human being, said package comprising a flexible, liquid impervious bag; a non-toxic, liquid elastomeric material introducible into an internal cavity of a human being and capable of being set in the presence of a setting agent at a temperature compatible with cell viability to a surface-conforming, coherent unplastic, pliant conditions, with a sufficiently fine-grained surface to reproduce for diagnosis the physical features of abnormalities sought to be detected, and sufficient of a radiopaque substance to render the elastomeric material readily observable radiologically when said material is within the body, both the elastomeric and the radiopaque substance being contained within said bag; a rupturable container within said bag; a setting agent sealed within said rupturable container; a conduit communicating with the interior of said bag at one end, and adapted for insertion into and opening into said cavity at its other end, and cavity entrance-blocking means mounted on said conduit around the outside thereof.

2. The composition package of claim 1 wherein the cavity entrance-blocking means mounted on the conduit is an inflatable bladder with an air tube communicating with the interior thereof.

References Cited by the Examiner
UNITED STATES PATENTS

| 2,155,658 | 5/1939 | Herrmann | 167—95 |
| 2,413,480 | 12/1946 | Winter | 128—263 |
| 2,832,722 | 4/1958 | Singher | 167—95 |
| 2,970,945 | 2/1961 | Free et al. | 167—84.5 |
| 2,996,433 | 8/1961 | Hoppe et al. | 167—95 |

OTHER REFERENCES

Brown: Annals of Surgery, vol. 152, No. 3, September 1960, pp. 534–537.

The Bulletin by Dow-Corning, vol. 2, No. 2, April 1960, p. 8.

Thiokol Booklet, 2–59 (Polysulfide Polymers), 8 pages.

ROBERT E. MORGAN, *Acting Primary Examiner.*

SIMON BRODER, *Examiner.*